United States Patent [19]
Leffler

[11] 3,853,350
[45] Dec. 10, 1974

[54] ADJUSTABLE HEADREST AND BACKREST FOR A CHAIR

[75] Inventor: Dennis Frank Leffler, Charlotte, N.C.

[73] Assignee: Pelton & Crane Company, Charlotte, N.C.

[22] Filed: May 17, 1973

[21] Appl. No.: 361,241

[52] U.S. Cl. .............................................. 297/404
[51] Int. Cl. ......... A47c 1/10, A47c 7/12, A47c 7/36
[58] Field of Search ............................ 297/391–410

[56] References Cited
UNITED STATES PATENTS

| | | | |
|---|---|---|---|
| 8,935 | 5/1852 | Buell | 297/396 X |
| 1,260,032 | 3/1918 | Perpick | 297/410 |
| 3,265,437 | 8/1966 | Mincieli | 297/410 X |
| 3,284,134 | 11/1966 | Malittle | 297/391 X |
| 3,477,761 | 11/1969 | Krantz | 297/410 X |
| 3,511,535 | 5/1970 | Gunlock | 297/410 |
| 3,512,832 | 5/1970 | Koge | 297/410 |

*Primary Examiner*—Paul R. Gilliam
*Attorney, Agent, or Firm*—Parrott, Bell, Seltzer, Park & Gibson

[57] ABSTRACT

An adjustable headrest and associated backrest especially for treatment chairs, wherein the headrest is of substantial width throughout its length so as to provide added support for a patient's shoulder area between the upper edge of the backrest and the headrest cushion carried by the headrest. Improved guiding means, friction locking means and spring means are especially designed to accommodate the relatively wide headrest and also cooperate to facilitate ease of adjustment of the headrest relative to the backrest.

10 Claims, 13 Drawing Figures

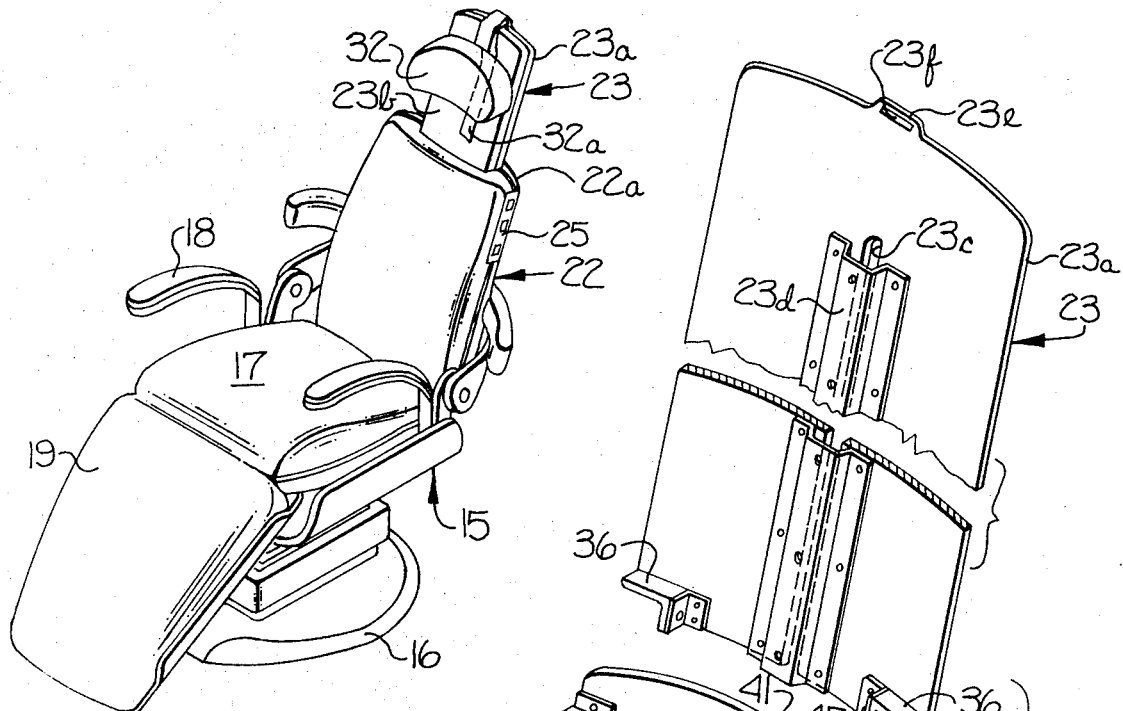
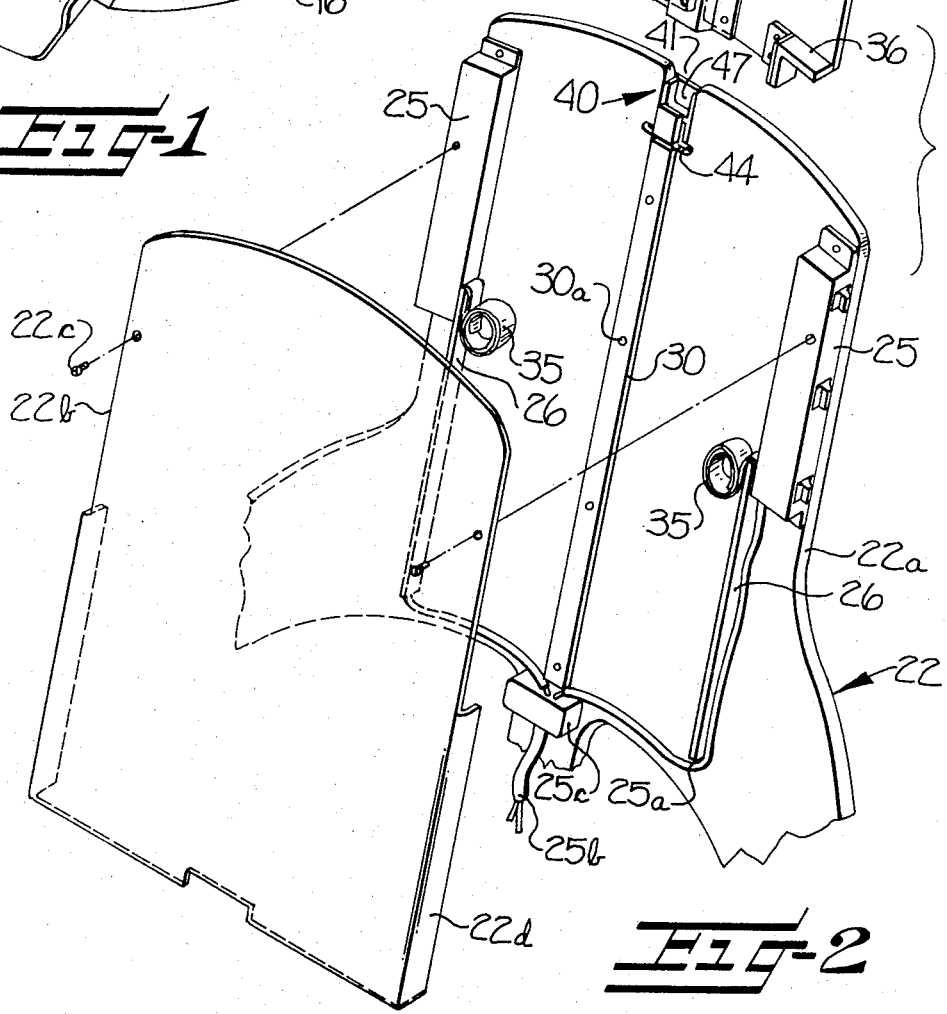

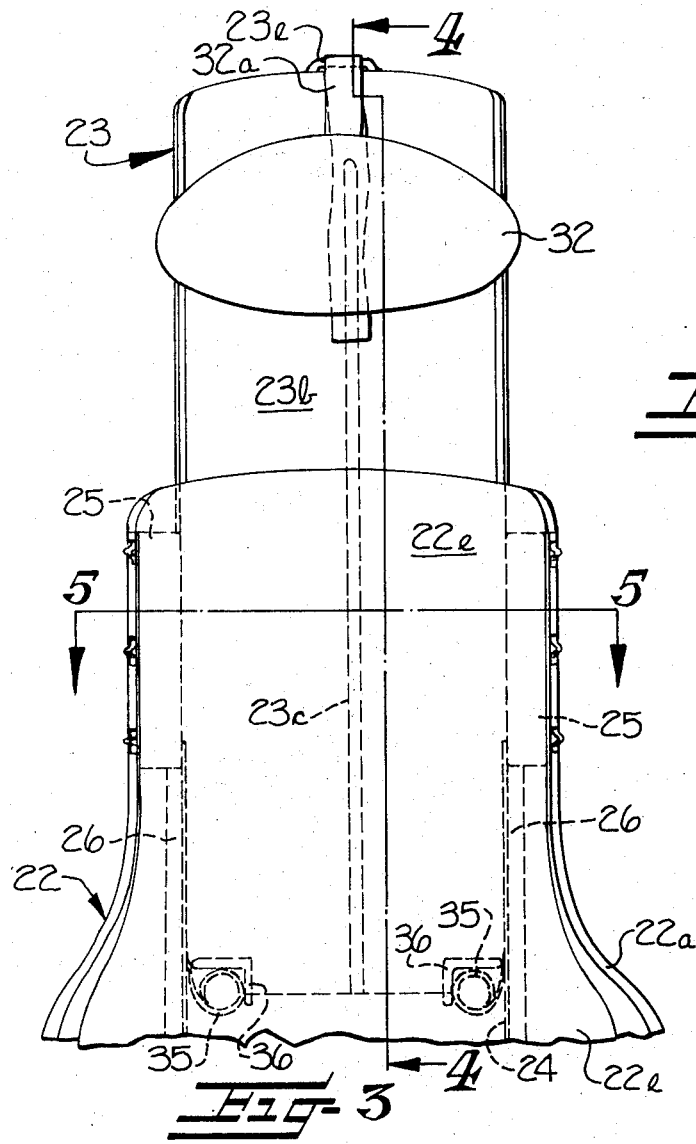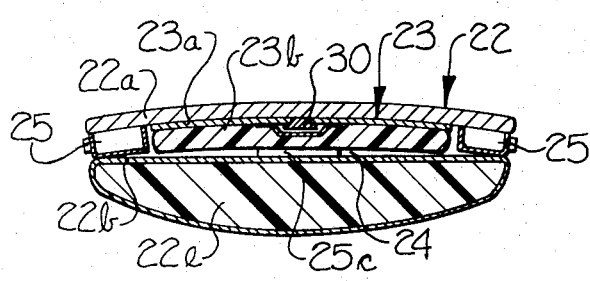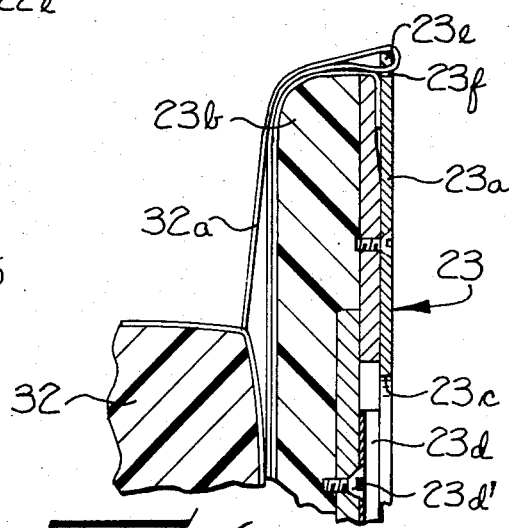

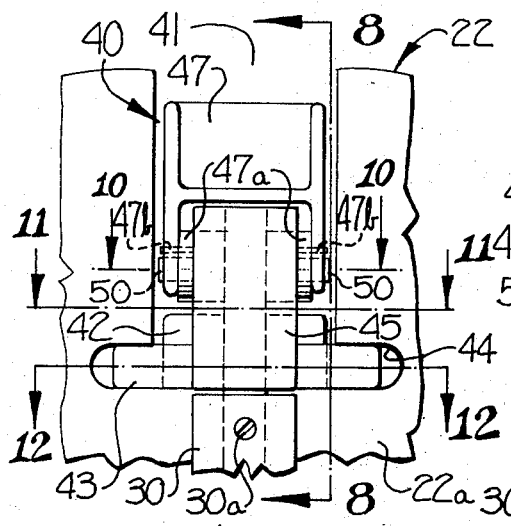
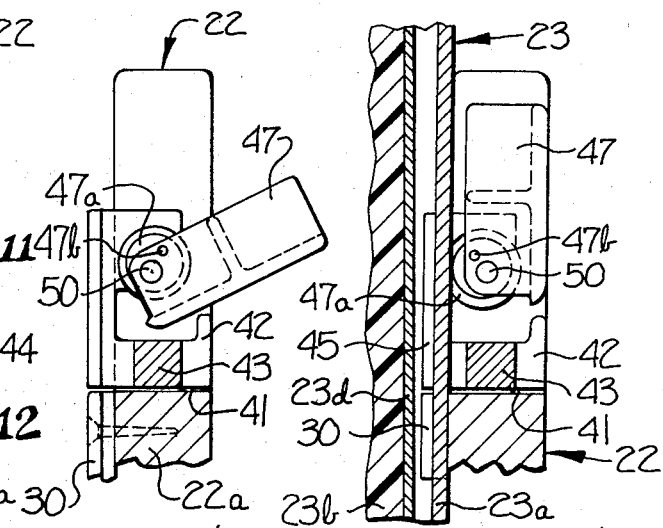
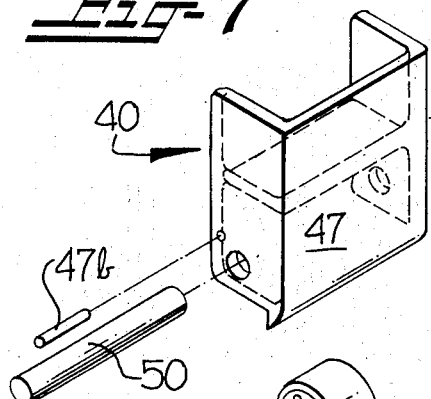
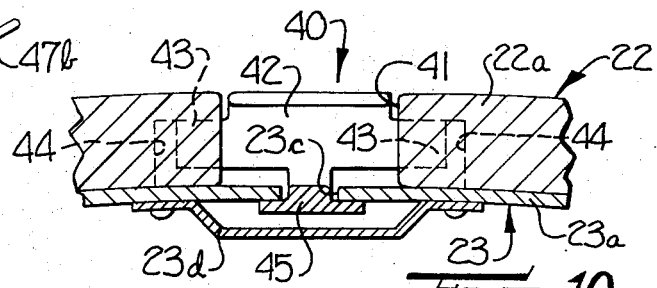
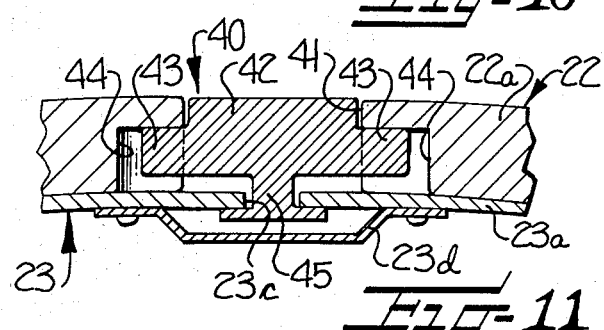
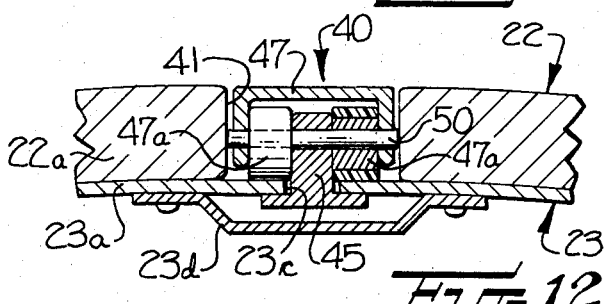

ADJUSTABLE HEADREST AND BACKREST FOR A CHAIR

Various forms of adjustable headrests have been proposed heretofore for treatment chairs such as are used by dentists, surgeons, beauticians and the like. Generally however, because of the desirablility of providing backrests which are of compact, light-weight construction, relatively thin and will not unduly encumber the attendant and his patient, difficulties have been presented heretofore in economically constructing an adjustable headrest which would be nearly as wide as and serve as a telescopic extension of the major upper portion of a backrest, while still providing for ease in adjustment of the headrest relative to the backrest. Such a relatively wide headrest is especially suited for use with chairs having backrests which are tiltable between substantially vertical and horizontal positions so as to provide adequate support for the shoulder area of a patient's or other occupant's back between the top of the backrest and the headrest cushion, regardless of the angular position of the backrest.

It is therefore an object of this invention to provide an improved adjustable headrest and associated backrest for a treatment chair or the like wherein the headrest is of substantially greater width throughout its length than conventional headrests so as to provide a greater area of support for the upper or shoulder area of an occupant of the chair, and wherein improved guiding means, locking means and spring means facilitate the use of such a relatively wide headrest while cooperating to permit ease of adjustment of the headrest relative to the backrest.

It is a more specific object of this invention to provide an adjustable headrest and associated backrest for a chair, wherein the headrest comprises an elongate, relatively wide and thin body preferably having an upholstered pad on the front face thereof and which is guided for substantially vertical adjustment in a substantially vertical passage provided in the backrest. Improved means are provided for guiding the headrest body in sliding engagement with the rear wall of the backrest passage, and also, bearing means on the lower portion of the headrest body engages and rides against a pair of torsion springs which are extended and retracted in accordance with the vertical adjustment of the headrest to at least partially counterbalance the weight of the headrest to aid in manual adjustment thereof.

Some of the objects and advantages of the invention having been stated, others will appear as the description proceeds when taken in connection with the accompanying drawings, in which FIG. 1 is a perspective view of a treatment chair embodying the improved adjustable headrest and associated backrest;

FIG. 2 is an enlarged partially exploded perspective view showing the improved headrest and associated backrest, with the upholstery, backrest cushion and headrest cover pad removed and with portions broken away;

FIG. 3 is an enlarged fragmentary elevation of the headrest and the major upper portion of the backrest as shown in FIG. 1 and including a headrest cushion resting against the front surface of the upholstered pad of the headrest, and also including the upper portion of an upholstered backrest cushion on the backrest;

FIG. 4 is a vertical sectional view taken substantially along line 4—4 in FIG. 3;

FIG. 5 is a sectional plan view taken substantially along line 5—5 in FIG. 3;

FIG. 6 is an enlarged fragmentary view of the uppermost portion of the headrest shown in FIG. 4;

FIG. 7 is an enlarged fragmentary front elevation taken substantially along line 7—7 in FIG. 4, but omitting the headrest and particularly illustrating an improved friction locking means;

FIG. 8 is a fragmentary elevation, partially in section, taken substantially along line 8—8 in FIG. 7 and showing the hand lever for the locking cam in a tilted inoperative position;

FIG. 9 is a view similar to FIG. 8, but showing a portion of the backrest in association therewith and also showing the hand lever for the locking cam means occupying an operative position;

FIGS. 10, 11 and 12 are fragmentary sectional plan views taken substantially along the respective lines 10—10, 11—11 and 12—12 in FIG. 7; and FIG. 13 is an exploded perspective view of the friction locking means looking at the rear or right-hand side thereof in FIG. 9, but wherein the friction locking means is removed from the backrest of the chair.

Referring more specifically to the drawings, and to FIG. 1 in particular, the numeral 15 broadly designates a treatment chair including a base 16, a seat 17, an armrest 18, a leg rest 19, a backrest broadly designated at 22, and a headrest broadly designated at 23. In general, the headrest is in effect an upward telescopic extension of the backrest and, since the backrest and headrest normally occupy a generally vertical position, they will be described as though oriented in this position. However, it is to be distinctly understood that the backrest and the headrest may be tilted rearwardly into a reclining or substantially horizontal position. Therefore, the term "vertical" is used herein with reference to the backrest primarily for the purpose of defining the relationship between backrest 22, headrest 23 and other elements associated therewith.

As illustrated, the treatment chair 15, shown in FIG. 1 is generally of a type such as is disclosed in my copending application Ser. No. 257,743, filed May 30, 1972, and entitled "POWER OPERATED TREATMENT CHAIR," to which reference is made for a more detailed description thereof.

As best shown in FIGS. 2, 4 and 5, backrest 22 comprises a main body or rear wall member 22a and a front wall member 22b which define therebetween an open-topped generally vertically extending and relatively wide passage 24 (FIGS. 4 and 5) for loosely receiving therein the major portion of the length of the headrest 23. Headrest 23 preferably is of generally rectangular form and is of substantial width; i.e. headrest 23 may be very nearly as wide as the major upper portion of backrest 22, as preferred.

While it is not essential that any opposing sidewalls be provided for the upper area of the substantially vertical passage 24, suitable wall means may be provided therealong for supporting the usual upholstery material or, as is the case in this particular instance, elongate switch boxes 25 are secured to the front face of backrest wall member 22a adjacent its opposing substantially vertical or longitudinal side edges. Thus, the switch boxes 25 provide convenient locations for suitable switches which may be connected to suitable electrical operable mechanism, not shown, for shifting the chair seat 17 (FIG. 1) forwardly and rearwardly relative to base 16, for tilting leg rest 19 and/or for tilting or raising and lowering backrest 22 and headrest 23. By way of example, the proximal surfaces of switch boxes 25 are shown as forming approximately the upper halves of the opposing side walls of the passage 24. The lower half of each opposing side wall of the headrest receiving passage 24 is formed of an elongate vertically extending rigid member 26 which may take the form of an angle bar and is suitably secured to the front surface of the backrest rear wall member 22a.

The front wall member 22b, which is preferably made from sheet metal, may be suitably secured, as by screws 22c (FIG. 2), to the front surfaces of the switch boxes 25, with the upper edge of front wall member 22b being disposed on substantially the same level as the upper edge of rear wall member 22a. The lower portion of front wall member 22b is provided with a pair of laterally spaced rearwardly projecting flanges 22d thereon which bear against the front surface of rear wall member 22a below the switch boxes 25 and which also straddle the angle bars 26 so as to provide channels between the angle bars 26 and the respective flanges 22d for the passage of electrical conductors or wires 25a therethrough.

It will be observed in FIG. 2 that the conductors 25a extend inwardly from beneath the lowermost edges of the two angle bars 26 and are connected to a common conductor cable 25b through a junction box 25c suitably secured to a lower medial portion of backrest rear wall member 22a. Conductor cable 25b extends forwardly and is connected to electrical components, not shown, disposed beneath the cushion of seat 17 and which form no part of the present invention and, therefore, need not be illustrated or described. A suitable resilient, upholstered backrest cushion or pad 22e overlies and is suitably secured to the front surface of front wall member 22b.

It is preferred that the backrest rear wall member or body 22a is made from preformed laminated wood or comparable light-weight material. Therefore, rear wall member 22a preferably is about as thick as the vertical passage 24 (FIGS. 4 and 5); e.g., rear wall member 22a of backrest 22 may be about ¾ to 1-¼ inches thick.

As indicated earlier herein, headrest 23 is of substantial width and is adapted to be telescopically loosely positioned at its lower portion within the passage 24 of backrest 22. It is preferred that headrest 23 is at least about one-half to two-thirds the width of at least the adjacent major portion of the backrest 22. In other words, it is preferred that headrest 23 is at least about one-half to two-thirds the width of the backrest cushion 22e.

The headrest 23 comprises an elongate substantially rectangular body 23a in the form of a plate of rigid material, preferably metal. In order to accommodate cooperating guide means connecting the headrest body 23a to the rear wall member 22a substantially along the longitudinal median center thereof, it is preferred that both the rear wall member 22a and headrest body 23a are curved or arcuately formed transversely thereof so that a substantially flat upholstered pad 23b may be readily secured against the front face of headrest body 23a and may be substantially the same shape and size as headrest body 23a. It will be observed in FIG. 4 that the upholstered pad 23b is also relatively thin so that both the upholstered pad 23b and the backing plate or headrest body 23a therefor may readily fit loosely within the substantially vertical slot 24 in backrest 22.

The central portion of headrest body 23a is provided with a longitudinally extending guideway slot 23c therethrough which is open at its lower end and is of a length at least equal to one-half of the length of the headrest body 23a. From a practical standpoint, it is apparent that the guideway slot 23c, whose opposing side edges define elements of the aforementioned cooperating guide means, terminates sufficiently close to the uppermost free edge of headrest body 23a so that, with the exception of about 4 to 6 inches of the upper end portion of the headrest 23, the entire headrest 23 may be adjustably positioned within the backrest passage 24.

In order to effectively guide the headrest 23 during vertical adjustment thereof relative to backrest 22 without the headrest 23 being encumbered by the side walls of the backrest passage 24 and while preventing the headrest 23 from being canted at an angle with respect to the side walls of the backrest opening 24 to such extent to become bound by engagement therewith, it will be observed in FIGS. 2 and 5, in particular, that the median longitudinal central portion of the backrest rear wall member 22a is provided with a longitudinally extending guide bar 30 extending throughout a major portion of the length thereof. Guide bar 30 is suitably secured to the front surface of the rear wall of backrest 22a, as by a plurality of screws 30a. Guide bar 30 should be so constructed as to be loosely received in the slot 23c for sliding movement of the headrest body 23a relative to guide bar 30. On the other hand, guide bar 30 should have suitable limiting means on its outer portion spaced from the wall member 22a and overlying the headrest body 23a adjacent the slot 23c so as to hold the headrest body for sliding adjustment against the backrest rear wall member 22a. Accordingly, as shown in FIGS. 2 and 5, guide bar 30 is substantially T-shaped in cross-section and thus includes a web portion which is relatively narrow and a relatively broad flange with the flange serving as the limiting means and being spaced from the backrest rear wall member 22a a distance slightly greater than the thickness of headrest body 23a.

Since the headrest upholstered pad 23b must be secured to the front face of the rigid headrest body 23a, but must not interfere with the vertical sliding movement of headrest body 23a along guide bar 30, it will be observed in FIG. 2 that the longitudinal median portion of the front face of headrest body 23a has an elongate substantially channel-shaped shield 23d suitably secured thereto and overlying the slot 23c substantially throughout the length thereof. Shield 23d may be formed of any suitable rigid material, such as sheet metal, and also is of such width internally thereof as to overlie the flange on the outer or front portion of guide bar 30 without engaging the same or, at least, without binding in engagement with the guide bar 30 to such extent as to encumber the movement of headrest 23 relative to backrest 22. Conveniently, the upholstered pad 23b of headrest 23 is secured against the front surface of shield 23d by suitable screws or other fasteners 23d' (FIG. 6) which may be inserted through shield 23d and embedded in pad 23b by access through the guideway slot 23c.

As heretofore indicated, at least the upper end portion of the upholstered pad 23b of headrest 23 conforms substantially to the shape and size of headrest body 23a and, of course, the upholstered pad 23b extends throughout at least the major portion of the length of headrest body 23a and preferably extends all the way to the lowermost edge thereof. Since it is preferred that the upper edge of the upholstered pad 23 conforms substantially to the shape of the upper edge of headrest body 23a, and it is desirable to provide an enlarged or bulky upholstered headrest cushion which is adjustable against the front upper portion of headrest pad 23b, it will be observed in FIGS. 2 and 6, in particular, that the central uppermost portion of headrest body 23a is provided with a relatively small projection 23e thereon through which a relatively short, laterally extending and relatively narrow strapreceiving slot 23f is formed. Thus, an elongate pliable strap 32a on the headrest cushion 32 may be looped through the slot 23f to adjustably suspendingly support the headrest cushion 32 with the cushion resting upon the front surface of the upholstered pad 23b of headrest 23.

To further facilitate ease in vertically adjusting headrest 23 relative to backrest 22 while preserving the relatively thin, compact construction of the backrest, the upper outer ends of a pair of laterally spaced convolute-wound torsion springs 35 are attached to the backrest body 22a preferably by being suitably secured to the upper ends of the respective rigid bars 26 as shown in FIG. 2. Each torsion spring 35 preferably is in the form of a coiled flexible tape of a width slightly less than the corresponding space in the backrest passage 24 between wall members 22a, 22b. Each spring 35 is inherently biased to a tightly coiled condition substantially as shown in FIG. 2.

The strip material or tape of which each torsion spring 35 is made should be sufficiently longer than the extent to which it will be unwound by the downward adjustment of the headrest 23 thereagainst so that a substantial coiled portion then still remains in each of the springs 35. It should be noted that, whenever the torsion springs 35 are being unwound by the downward adjustment of the headrest 23, the torsion springs are extended along the proximal surfaces of the rigid bars 26 which thus serve as rigid back-up members to aid in controlling the springs 35 so that the convolute coils thereof will remain in proper engagement with the headrest 23. Also, the then extended reaches of the springs 35 actually define the opposing side walls of the lower portion of passage 24 (FIGS. 4 and 5).

In order to insure that the coiled portions of the torsion springs 35 remain in proper engagement with headrest 23 and do not become unduly worn during extensive use of the corresponding treatment chair 15, it will be observed in FIGS. 2 and 4 that the opposing lower corners of headrest body 23a are provided with bearing means in the form of a pair of angle brackets or angle bearing blocks 36 of a relatively low friction bearing material, such as a synthetic plastic material. Angle bearing blocks 36 are suitably secured to headrest body 23a and have substantially horizontal lower bearing surfaces engageable with the upper surfaces of the outer convolutions of the respective torsion springs 35. Additionally, angle bearing blocks 36 have substantially vertical outwardly facing bearing surfaces which engage the proximal surfaces of the convolutions of the two torsion springs, as is clearly illustrated in the lower portion of FIG. 3.

It is thus seen that, whenever headrest 23 is being adjusted downwardly in the backrest passage 24, the bearing members or blocks 36 engage and ride against the outer convolutions of the torsion springs 35 so as to partially unwind the same as the convolutions thereof are being rolled downwardly against the proximal surfaces of the rigid bars 26. Conversely, whenever headrest 23 is being adjusted upwardly in backrest passage 24, its weight may be substantially counterbalanced by the torsion springs 35 as they wind up against the bearing members 36 and thereby apply a lifting force to headrest 23 to aid substantially in the upward adjustment thereof.

An improved locking means is provided (FIGS. 2, 4 and 7-13) for readily frictionally locking headrest 23 in any selected position of adjustment relative to backrest 22, and which locking means is compact and does not normally form any undesirable protrusion on backrest 22 supporting the same. Such locking means is broadly designated at 40 and is largely disposed within an open-topped cavity or opening 41 formed in the central portion of the upper edge of backrest rear wall member 22a. The upper end of guide bar 30 terminates adjacent or below the bottom wall of cavity 41, and a bracket 42 normally rests against the bottom wall of cavity 41.

Bracket 42 normally fits loosely between opposing sidewalls of cavity 41 and it has a pair of laterally projecting ears or key portions 43 on the lower opposite sides thereof which loosely fit in corresponding key slots 44 formed in the front face of the rear wall member 22a of backrest 22. The lower surfaces of the key slots 44 preferably are about flush with the bottom wall of cavity 41 and the key slots 44 are closed at their rear portions so that bracket 42 will not fall rearwardly out of the cavity 41 in the event of the headrest 23 being entirely removed from the backrest passage 24 (FIG. 4).

As best shown in FIGS. 10–13, bracket 42 is provided with a substantially T-shaped front portion 45 whose web is preferably of about the same thickness as the web of guide bar 30 and which fits loosely in the guideway slot 23c provided in headrest body 23a. The flange of the T-shaped portion 45 of bracket 42 is positioned adjacent and overlies a portion of the front face of the headrest body 23a when it is assembled with backrest 22 in the manner heretofore described. It is apparent that the key portions 43 on bracket 42, while in engagement with the respective key slots 44, serve as means for restraining the bracket 42 against vertical displacement relative to the backrest wall member 22a.

A locking hand lever 47 is pivotally mounted, by means of a shaft 50, on the upper portion of the web of the T-shaped portion 45 of bracket 42, with the hand lever 47 fitting loosely between the opposing side walls of the cavity 41 in backrest rear wall members 22a. When headrest body 23a is properly positioned with its lower portion within the backrest passage 24 with the web of the T-shaped portion 45 of bracket 42 positioned within slot 23c as shown in FIGS. 9–11, hand lever 47 is spaced rearwardly of headrest body 23a. When hand lever 47 is tilted or pivoted outwardly or rearwardly as shown in FIG. 8, a pair of eccentric locking elements or rollers 47a carried by hand lever 47 then are positioned out of frictional locking engagement with the rear surface of headrest body 23a.

Eccentric rollers 47a also may be termed as eccentric locking cams and are preferably provided with plastic, rubber or other resilient peripheral surfaces, as best shown in FIGS. 8, 9, 12 and 13. The rollers 47a are mounted in offcenter relation on pivot shaft 50, astraddle the web of the T-shaped portion of bracket 42. Further, the eccentric rollers 47a are arranged to be moved in fixed relation with hand lever 47, as by suitable eccentric locking pins 47b (FIG. 13), which penetrate the flange portions on opposite sides of hand lever 47 and also are embedded in eccentric rollers 47a. Of course, rollers 47a project forwardly of the plane of the flanges of hand lever 47 so that, when hand lever 47 occupies the operative position with its rear flat surface in substantial alignment with the rear surface of backrest rear wall member 22a as shown in FIG. 9, the eccentric rollers 47a tightly engage the rear surface of headrest body 23a adjacent the slot 23c therein, as best shown in FIG. 12, to thus pull the front flange of bracket 42 against the front surface of headrest body 23a and thereby releasably frictionally lock the headrest body 23a in any selected position of adjustment.

It is to be noted that, by constructing the friction locking means 40 in the manner described, it is unnecessary to provide any special brackets or fastening devices for attaching the friction locking means 40 to the backrest 22 or headrest 23. In this regard, with the headrest 23 removed from backrest 22, the locking means may be installed in or removed from opening 41 in headrest simply by inserting or removing the key portions 43 of bracket 42 through the open front sides of the key slots 44. After installing the locking means 40, the open lower end of guideway slot 23c in headrest body 23a is aligned with the web of T-shaped portion 45 of bracket 42, and then the headrest 23 is moved along the latter T-shaped portion and the guide bar 30 to the desired position of adjustment, thus automatically retaining bracket 42 in opening 41 of backrest rear wall 22a.

It is thus seen that, although headrest 23 is relatively wide and, therefore may be quite heavy, the improved cooperating guide means between backrest 22 and headrest 23, the convolute torsion springs 35 and the improved locking means 40 cooperate with one another to facilitate ease in adjustment of headrest 23 relative to backrest 22 and in the locking of headrest 23 in any selected position of adjustment, requiring relatively little effort on the part of the attendant utilizing the treatment chair 15.

In the drawings and specification, there has been set forth a preferred embodiment of the invention, and although specific terms are employed, they are used in a generic and descriptive sense only and not for purposes of limitation.

What is claimed is:

1. In a treatment chair including a seat portion and a tiltable, upwardly-extending backrest for reception and positioning of a patient in a variety of positions for treatment by an operator; the improvement of a headrest assembly telescopingly carried by said backrest for adjustment to desired positions for different size patients and characterized by providing support to the shoulder area of a patient and counterbalanced adjustment mechanisms for ease in adjustment thereof to any desired position; said headrest assembly comprising:

a continuous, generally rectangular, relatively thin, body portion of substantial width at least one-half but less than the width of said backrest for providing a continuous support for the shoulder and head areas of a seated patient while allowing easy access to the head of the patient by an operator;

means contained within said backrest defining a longitudinally-extending, open-topped, relatively wide passageway for telescoping reception of said headrest body portion through the top of said backrest for longitudinal adjustment of said headrest body portion therein and outwardly thereof to desired positions;

counterbalance means positioned within said passageway in engagement with said headrest body portion biasing said body portion generally upwardly and outwardly of said backrest and counterbalancing the weight of the said body portion for ease in adjustment thereof to any desired position; and friction locking means carried by said backrest for frictional engagement with said headrest body portion when said body portion is placed in any desired position for locking said headrest assembly in such position and being releasable for unlocking said headrest assembly when adjustment thereof is desired.

2. In a treatment chair, as set forth in claim 1, in which said counterbalance means includes a pair of laterally spaced, convolute wound, torsion springs having corresponding outer end portions attached to said backrest to define laterally opposite sides of at least a portion of said passageway therein and with the convolutions thereof facing inwardly, bearing means carried by the lower portion of said headrest body portion and engaging and riding against the outer convolution of said torsion springs for causing said springs to be unwound and extended progressively by said bearing means during downward and inward positioning movement of said headrest body portion and for winding up and applying a lifting force to said headrest body portion during upward and outward movement thereof; and elongate, rigid, back-up members secured to the inside of said backrest on each side of said passageway therein and engaging the distal surfaces of said torsion springs and against which said torsion springs unwind as said headrest body portion is adjusted inwardly and downwardly in said passageway.

3. In a treatment chair, as set forth in claim 1, in which said headrest assembly further includes a relatively thin, upholstered pad of substantially the same size and shape as said body portion and secured to the front surface of said body portion for telescoping movement within and out of said backrest passageway and for providing a comfortable support for the seated patient, and a headrest cushion secured to said headrest body portion at the upper end thereof for providing a comfortable support for the head of the seated patient.

4. In a treatment chair, as set forth in claim 1, in which said headrest assembly further includes guiding and stabilizing means connected with said backrest within said passageway therein and with said headrest body portion for guiding and stabilizing said body portion during movement thereof to desired positions.

5. In a treatment chair, as set forth in claim 4, in which said guiding and stabilizing means comprises
   a longitudinally-extending, generally medial, guide slot extending through a major portion of the length of said headrest body portion and being open at its lower end, and
   an elongate guide bar of substantially T-shaped cross-section extending generally longitudinally along and secured to a medial portion of the inside of said backrest at the rear of said passageway therein, said guide bar including a web portion extending through said guide slot in said headrest body portion and a lateral flange of a width greater than said slot for holding said body portion on said guide bar for guiding and stabilizing movement.

6. In a treatment chair, as set forth in claim 1, in which said backrest defines an opening in the upper rear portion thereof generally medially of said passageway therethrough; and in which said friction locking means is positioned in said opening and includes a pivotally mounted lever and a locking member eccentrically carried by said lever for frictionally engaging said body portion of said headrest assembly when said lever is pivoted to one position thereof for locking said body portion in the adjusted position thereof and for moving out of friction engagement with said body portion of said headrest member when said lever is pivoted to the other position thereof for releasing said body motion for movement thereof to another adjusted position.

7. In a treatment chair including a seat portion and a tiltable, upwardly extending backrest for reception and positioning of a patient in a variety of positions for treatment by an operator; the improvement of a headrest assembly telescopingly carried by said backrest for adjustment to desired positions for different size patients and characterized by providing support to the shoulder area of the patient and counterbalanced adjustment mechanisms for ease in adjustment thereof to any desired position; said headrest assembly comprising:
   a continuous, generally rectangular, relatively thin, body portion of substantial width at least one-half but less than the width of said backrest and having a relatively thin, upholstered pad of substantially the same size and shape as said body portion and being secured to the front surface thereof for movement therewith and a headrest cushion secured to said body portion and overlying said upholstered pad at the upper end thereof, said body portion and said upholstered pad and said cushion providing a continuous support for the shoulder and head areas of a seated patient while allowing easy access to the head of the patient by an operator;
   means contained within said backrest defining a longitudinally-extending, open-topped, relatively wide passageway for telescoping reception of said headrest body portion with said upholstered pad thereon through the top of said backrest for longitudinal adjustment inwardly and outwardly to desired positions;
   counterbalance means positioned within said backrest passageway in engagement with said headrest body portion biasing said body portion generally upwardly and outwardly of said backrest and counterbalancing the weight of said headrest body portion for ease in adjustment thereof to any desired position, said counterbalance means comprising a pair of laterally spaced, convolute wound, torsion springs having corresponding outer end portions attached to said backrest to define laterally opposite sides of at least a portion of said backrest passageway and with the convolution thereof facing inwardly, bearing means carried by the lower portion of said headrest body portion and engaging and riding against the outer convolution of said torsion springs for causing said springs to be unwound and extended progressively by said bearing means during downward and inward positioning movement of said headrest body portion and for winding up and applying a lifting force to said headrest body portion during upward and outward movement thereof;
   guiding and stabilizing means connected with said backrest within said passageway therein and with said headrest body portion for guiding and stabilizing said body portion during movement thereof to desired positions, said guiding and stabilizing means comprising a longitudinally-extending, generally medial, guide slot extending through a major portion of the length of said headrest body portion and being open at its lower end, and an elongate guide bar of substantially T-shaped cross-section extending generally longitudinally along and secured to a medial portion of the inside of said backrest at the rear of said passageway therein and including a web portion extending through said guide slot in said headrest body portion and a lateral flange of a width greater than said slot for holding said headrest body portion on said guide bar for guiding and stabilizing movement; and
   friction locking means carried by said backrest for frictional engagement with said headrest body portion when said body portion is placed in any desired position for locking said headrest assembly in such position and being releasable for unlocking said headrest assembly when adjustment thereof is desired.

8. In a treatment chair, as set forth in claim 7, in which the upper end of said guide bar on the inside of said backrest at the rear of said passageway therein is spaced below the upper end of said backrest and said backrest defines an opening in the upper rear portion thereof generally medially of the said passageway therethrough and being of substantially greater width than said guide slot in said headrest body portion; and in which said friction locking means comprises
   a bracket positioned in said opening and having a substantially T-shaped portion including a web member fitting loosely in said guide slot in said headrest body portion and a flange member positioned adjacent and overlying the front face of said body portion adjacent said guide slot,
   means restraining said bracket against vertical displacement relative to said backrest,
   a hand lever pivotally mounted on said bracket and rearwardly of said headrest body portion, and
   at least one eccentric locking element carried by said lever adjacent the pivotal axis thereof and positioned to releasably frictionally engage and lock said headrest body in any selected position of adjustment.

9. In a treatment chair, as set forth in claim 7, in which said headrest assembly further includes an elongate, channel-shaped shield carried by said headrest body portion and overlying said guide slot therein and said flange portion of said guide bar extending through said slot for preventing engagement of said guide bar with said upholstered pad secured to the front face of said body portion.

10. In a treatment chair, as set forth in claim 7, in which the uppermost central portion of said headrest body portion includes a relatively short, laterally extending and relatively narrow strap receiving slot therethrough, and in which said headrest cushion includes a strap thereon for extending through said strap receiving slot for suspendingly supporting said headrest cushion upon the front surface of said upholstered pad.

* * * * *